W. JOHNSON.
TROLLEY.
APPLICATION FILED JAN. 14, 1921.
1,373,007.
Patented Mar. 29, 1921.
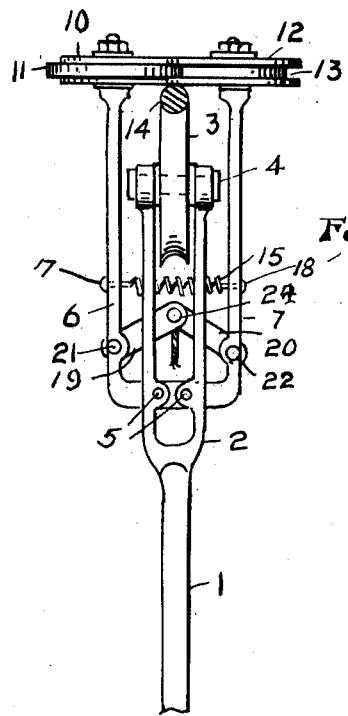
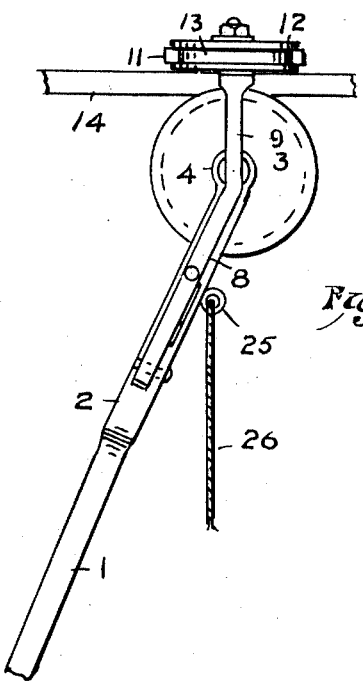
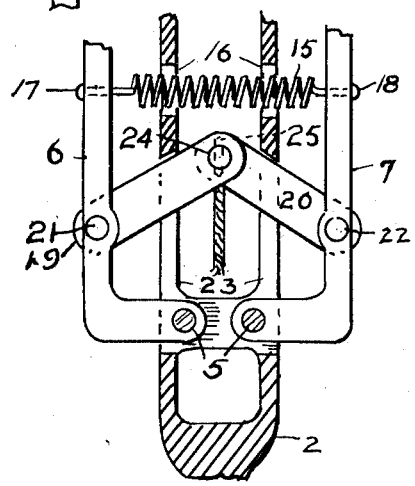
WITNESS
R. F. Dilworth
INVENTOR
Wesley Johnson
By Jas. R. Snyder
attorney

UNITED STATES PATENT OFFICE.

WESLEY JOHNSON, OF PITTSBURGH, PENNSYLVANIA.

TROLLEY.

1,373,007. Specification of Letters Patent. Patented Mar. 29, 1921.

Application filed January 14, 1921. Serial No. 437,157.

*To all whom it may concern:*

Be it known that I, WESLEY JOHNSON, a citizen of the United States, residing at Pittsburgh, in the county of Allegheny and State of Pennsylvania, have invented certain new and useful Improvements in Trolleys, of which the following is a specification.

This invention relates to trolleys, and the primary object thereof is to provide a trolley with means for maintaining the trolley wheel in contact with the trolley wire, and prevent the accidental escape of the trolley from the latter.

Further objects of the invention are to provide a device of the character described which is simple in its construction and arrangement, strong, durable and efficient in its use, inexpensive to manufacture, positive in its action, and whereby the trolley can be conveniently removed from or replaced against the trolley wire when occasion so requires.

To the accomplishment of these and such other objects as may hereinafter appear, the invention consists of the novel construction, combination and arrangement of parts herein specifically described, and illustrated in the accompanying drawing, wherein is shown an embodiment of the invention, but it is to be understood that changes, variations, and modifications can be resorted to which come within the scope of the claims hereunto appended.

In the drawing forming a portion of this specification and wherein like numerals of reference designate corresponding parts throughout the several views:

Figure 1 is a front elevation of a trolley in accordance with this invention.

Fig. 2 is a side elevational view thereof.

Fig. 3 is an enlarged detail view of the device with portion thereof in section, and with portions broken away.

Referring in detail to the drawing 1 denotes the trolley pole, provided at its upper end with the harp 2 of the usual construction. A grooved trolley wheel 3, carried by the shaft 4, is rotatively mounted in the upper ends of the arms of the harp 2.

Hingedly connected, as at 5, adjacent to the lower portion of the harp 2, are a pair of opposed supporting arms 6 and 7, each comprising an angularly disposed portion 8 and the vertical portion 9. The angularly disposed portions 8, of the supporting arms, extend parallel with the arms of the harp 2.

Rotatively mounted on the upper end of the supporting arm 6 is a wheel 10 having its periphery provided with a centrally disposed annular flange 11, and rotatively mounted on the upper end of the supporting arm 7 is a wheel 12 having its periphery provided with a centrally disposed annular groove 13, which is adapted to be inter-fittingly engaged by the annular flange 11 formed on the wheel 10.

When the trolley is positioned on the conductor wire 14, the latter extends in the grooved trolley wheel 3, directly beneath the inter-fitting portions of the wheels 10 and 13, which latter constitute retaining members and operate to prevent the accidental escape of the wire 14 from the trolley wheel 3.

For the purpose of holding the wheels 10 and 13 normally in the engaged position, over the conductor wire 14, a coil spring 15 is provided, which passes through the apertures 16 in the harp arms and has one end connected, as at 17, to the supporting arm 6 and the other end, as at 18, to the supporting arm 7.

For disengaging the retaining members or wheels 10 and 13 from each other when it is desired to remove or replace the trolley on the conductor wire 14, a toggle element is provided comprising a pair of extension bars 19 and 20, the former having its outer end pivotally connected, as at 21, to the supporting arm 6, and the outer end of the latter pivotally connected, as at 22, to the supporting arm 7. The extension bars 19 and 20 extend through slots 23 in respective harp arms, which serve as guide-ways therefor. The bars 19 and 20 are normally disposed to incline upwardly toward each other, and the inner ends thereof are pivotally connected together with the bolt 24.

The bolt 24 is provided with an eye 25 to which is attached the pull rope 26. A downward pull on the rope 26 will actuate the toggle element to operate the supporting arms 6 and 7 to disengage the retaining members 10 and 12 from each other, and permit of the removal or replacement of the trolley wheel 3. The downward movement of the toggle bars 19 and 20 is limited by the length of the slots 23 through which they extend, thus preventing liability of the bars buckling in the downward direction.

What I claim is:

1. A trolley comprising a harp including a pair of arms, a trolley wheel journaled therein, spring controlled supporting arms pivotally connected to the harp and extending above said wheel, inter-engaging retaining members carried by the upper ends of said supporting arms and arranged over and spaced from the trolley wheel, a toggle element for spacing said retaining members apart, said element extending through the arms of the harp and connected to the supporting arms.

2. A trolley comprising a harp provided with a pair of arms, a trolley wheel rotatably mounted in the upper ends of said arms, spring controlled supporting arms pivotally connected to the harp and extending above the trolley wheel, inter-engaging retaining members rotatively carried by the upper ends of the supporting arms and arranged over and spaced from the trolley wheel, a toggle element for spacing said retaining members apart, means for limiting the movement of the toggle element, said toggle element extending through the arms of the harp and pivotally connected to the supporting arms.

In testimony whereof I affix my signature.

WESLEY JOHNSON.